US012537874B2

(12) United States Patent
Kawaai et al.

(10) Patent No.: US 12,537,874 B2
(45) Date of Patent: *Jan. 27, 2026

(54) DEVICE, PROGRAM, METHOD, AND SYSTEM FOR PROVIDING LEARNED MODELS

(71) Applicant: Preferred Networks, Inc., Tokyo (JP)

(72) Inventors: Keigo Kawaai, Tokyo (JP); Shohei Hido, Tokyo (JP); Nobuyuki Kubota, Tokyo (JP); Daisuke Tanaka, Tokyo (JP)

(73) Assignee: Preferred Networks, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/532,102

(22) Filed: Dec. 7, 2023

(65) Prior Publication Data

US 2024/0129368 A1 Apr. 18, 2024

Related U.S. Application Data

(60) Division of application No. 17/752,786, filed on May 24, 2022, now abandoned, which is a continuation of
(Continued)

(51) Int. Cl.
*H04L 67/08* (2022.01)
*G06F 15/16* (2006.01)
(Continued)

(52) U.S. Cl.
CPC ............... *H04L 67/12* (2013.01); *G06N 3/02* (2013.01); *G06N 20/10* (2019.01); *H04L 67/08* (2013.01); *H04W 12/06* (2013.01); *H04W 88/06* (2013.01)

(58) Field of Classification Search
CPC ....... H04L 67/12; H04L 67/08; H04L 67/303; H04L 67/34; G06N 3/02; G06N 20/10;
(Continued)

(56) References Cited

U.S. PATENT DOCUMENTS 5,239,619 A 8/1993 Takatori et al.
9,466,266 B2 10/2016 Hildreth et al.
(Continued)

FOREIGN PATENT DOCUMENTS

CN 106056529 A * 10/2016 ............... G06N 3/08
CN 118761389 A * 10/2024 ............. G06F 40/58
(Continued)

OTHER PUBLICATIONS

Miao et al., "Towards Unified Data and Lifecycle Management for Deep Learning", Arxiv. Org, Cornell University Library, 201 Olin Library Cornell University Ithaca, NY 14853, Nov. 18, 2016.
(Continued)

*Primary Examiner* — David R Lazaro
*Assistant Examiner* — Berhanu Shitayewoldetadik
(74) *Attorney, Agent, or Firm* — Foley & Lardner LLP (57) ABSTRACT

A server device configured to communicate, via a communication network, with at least one device including a learner configured to perform processing by using a learned model, includes processor, a transmitter, and a storage configured to store a plurality of shared models pre-learned in accordance with environments and conditions of various devices. The processor is configured to acquire device data including information on an environment and conditions from the at least one device, and select an optimum shared model for the at least one device based on the acquired device data. The transmitter is configured to transmit a selected shared model to the at least one device.

26 Claims, 3 Drawing Sheets

Related U.S. Application Data application No. 16/578,035, filed on Sep. 20, 2019, now Pat. No. 11,375,019, which is a continuation-in-part of application No. PCT/JP2017/011216, filed on Mar. 21, 2017.

(51) Int. Cl.

| | | |
|---|---|---|
| *G06F 15/177* | (2006.01) | |
| *G06N 3/02* | (2006.01) | |
| *G06N 20/10* | (2019.01) | |
| *H04L 12/06* | (2006.01) | |
| *H04L 15/16* | (2006.01) | |
| *H04L 67/12* | (2022.01) | |
| *H04W 12/06* | (2021.01) | |
| *H04W 88/06* | (2009.01) | |

(58) Field of Classification Search
CPC ....... G06N 3/088; G06N 20/00; H04W 12/06; H04W 88/06
USPC .......................................................... 709/223
See application file for complete search history.

(56) References Cited

U.S. PATENT DOCUMENTS

| | | |
|---|---|---|
| 9,681,025 B2 | 6/2017 | Takenouchi |
| 9,990,587 B2 | 6/2018 | Okanohara et al. |
| 10,042,150 B2 | 8/2018 | Brown |
| 10,311,372 B1 | 6/2019 | Hotchkies et al. |
| 10,387,794 B2 | 8/2019 | Okanohara et al. |
| 10,564,881 B2 | 2/2020 | Zhou et al. |
| 10,812,542 B2 | 10/2020 | Jeon et al. |
| 10,935,982 B2 | 3/2021 | Yao et al. |
| 10,943,681 B2 | 3/2021 | Yao et al. |
| 11,196,800 B2 | 12/2021 | Suresh et al. |
| 11,295,738 B2 | 4/2022 | Bhaya et al. |
| 11,392,840 B2 | 7/2022 | Santhanam et al. |
| 11,562,323 B2 | 1/2023 | Eberhardt, III et al. |
| 11,636,348 B1 | 4/2023 | Tang et al. |
| 2002/0015527 A1 | 2/2002 | Nambu |
| 2003/0139828 A1 | 7/2003 | Ferguson et al. |
| 2005/0092161 A1* | 5/2005 | Urata ................... G10H 1/0008 84/616 |
| 2005/0229241 A1 | 10/2005 | Carwile et al. |
| 2006/0248510 A1 | 11/2006 | Dournov et al. |
| 2007/0180069 A1 | 8/2007 | Syed et al. |
| 2007/0180070 A1 | 8/2007 | Syed et al. |
| 2008/0222065 A1* | 9/2008 | Kedrowski ............... G06N 3/08 706/19 |
| 2009/0222390 A1 | 9/2009 | Yuta |
| 2009/0276202 A1 | 11/2009 | Susarla et al. |
| 2009/0276203 A1 | 11/2009 | Everhart et al. |
| 2011/0307424 A1* | 12/2011 | Jin ......................... G06N 20/00 706/12 |
| 2012/0150777 A1 | 6/2012 | Setoguchi et al. |
| 2012/0239347 A1 | 9/2012 | Nitta |
| 2012/0284213 A1 | 11/2012 | Lin et al. |
| 2013/0018825 A1 | 1/2013 | Ghani et al. |
| 2014/0074761 A1 | 3/2014 | Hunzinger |
| 2014/0172753 A1 | 6/2014 | Nowozin et al. |
| 2014/0180970 A1 | 6/2014 | Hettenkofer et al. |
| 2014/0278307 A1 | 9/2014 | Hosey et al. |
| 2014/0370480 A1 | 12/2014 | Sugibuchi et al. |
| 2014/0376403 A1 | 12/2014 | Shao et al. |
| 2015/0100900 A1 | 4/2015 | Mao et al. |
| 2015/0134389 A1* | 5/2015 | Punera ..................... G06N 5/00 705/7.15 |
| 2015/0202773 A1 | 7/2015 | Nagashima |
| 2015/0242761 A1 | 8/2015 | Amershi et al. |
| 2015/0324690 A1 | 11/2015 | Chilimbi et al. |
| 2015/0363291 A1 | 12/2015 | Vengerov et al. |
| 2015/0365291 A1 | 12/2015 | Burton et al. |
| 2015/0379442 A1 | 12/2015 | Samanthapudi et al. |
| 2016/0109878 A1 | 4/2016 | Priddis et al. |
| 2016/0117601 A1 | 4/2016 | Gaucher et al. |
| 2016/0283275 A1 | 9/2016 | Li et al. |
| 2016/0371316 A1 | 12/2016 | Okanohara et al. |
| 2017/0054779 A1 | 2/2017 | Ehmann et al. |
| 2017/0065230 A1 | 3/2017 | Sinha et al. |
| 2017/0076198 A1 | 3/2017 | Jin et al. |
| 2017/0161603 A1 | 6/2017 | Okanohara et al. |
| 2017/0169356 A1 | 6/2017 | Dousse et al. |
| 2017/0228438 A1* | 8/2017 | Chavez .................. G06N 5/022 |
| 2017/0228775 A1 | 8/2017 | Yamada |
| 2017/0323199 A1* | 11/2017 | Wu ........................ G06N 3/04 |
| 2018/0025287 A1 | 1/2018 | Mathew et al. |
| 2018/0075367 A1 | 3/2018 | Yates et al. |
| 2018/0189667 A1 | 7/2018 | Tsou et al. |
| 2018/0254036 A1* | 9/2018 | Li .......................... G10L 15/063 |
| 2018/0277224 A1 | 9/2018 | Shirota et al. |
| 2018/0332483 A1 | 11/2018 | Yoon et al. |
| 2018/0336362 A1 | 11/2018 | Guttmann et al. |
| 2018/0350467 A1* | 12/2018 | Im ........................... G06N 3/10 |
| 2018/0365089 A1 | 12/2018 | Okanohara et al. |
| 2019/0087485 A1 | 3/2019 | Nishi |
| 2019/0147360 A1 | 5/2019 | Matsumoto et al. |
| 2019/0147361 A1 | 5/2019 | Matsumoto et al. |
| 2019/0179297 A1* | 6/2019 | Kuroda .................. G06N 20/00 |
| 2019/0197359 A1 | 6/2019 | Haneda et al. |
| 2019/0294999 A1 | 9/2019 | Guttmann |
| 2019/0311298 A1 | 10/2019 | Kopp et al. |
| 2019/0312772 A1 | 10/2019 | Zhao et al. |
| 2019/0324856 A1 | 10/2019 | Zhao et al. |
| 2019/0332069 A1 | 10/2019 | Saitou |
| 2019/0340536 A1 | 11/2019 | Lee et al. |
| 2019/0347285 A1 | 11/2019 | Yun et al. |
| 2019/0362522 A1 | 11/2019 | Han |
| 2019/0364081 A1 | 11/2019 | Valenzuela et al. |
| 2019/0385043 A1 | 12/2019 | Choudhary et al. |
| 2019/0385068 A1 | 12/2019 | Takeoka |
| 2020/0014761 A1 | 1/2020 | Kawaai et al. |
| 2020/0026589 A1 | 1/2020 | Ghosh et al. |
| 2020/0026992 A1* | 1/2020 | Zhang .................... G06N 3/084 |
| 2020/0035249 A1 | 1/2020 | Choi et al. |
| 2020/0090073 A1 | 3/2020 | Zhan et al. |
| 2020/0151611 A1 | 5/2020 | Mcgavran et al. |
| 2020/0167658 A1 | 5/2020 | Du |
| 2020/0174840 A1 | 6/2020 | Zhao et al. |
| 2020/0175416 A1 | 6/2020 | Zhao et al. |
| 2020/0219010 A1 | 7/2020 | Jobling et al. |
| 2020/0236120 A1 | 7/2020 | Monteil et al. |
| 2020/0236363 A1 | 7/2020 | Johnston et al. |
| 2020/0245009 A1 | 7/2020 | Saini et al. |
| 2020/0320977 A1* | 10/2020 | Li .......................... G10L 15/02 |
| 2020/0383582 A1 | 12/2020 | Bychkov |
| 2021/0271709 A1 | 9/2021 | Kazem et al. |
| 2022/0398262 A1* | 12/2022 | Derakhshani ......... G06F 16/285 |
| 2023/0034892 A1 | 2/2023 | Hummel et al. |
| 2023/0127542 A1 | 4/2023 | Moloney |
| 2023/0133009 A1 | 5/2023 | Ito et al. |

FOREIGN PATENT DOCUMENTS

| | | | |
|---|---|---|---|
| EP | 3451237 A1 * | 3/2019 | ............. G06N 3/049 |
| EP | 3 542 322 B1 | 9/2019 | |
| JP | 2002-268684 A | 9/2002 | |
| JP | 2007-213480 A | 8/2007 | |
| JP | 2011-191252 A | 9/2011 | |
| JP | 2014-228972 A | 12/2014 | |
| JP | 2015-001888 A | 1/2015 | |
| JP | 2016-173623 A | 9/2016 | |
| JP | 2016-173782 A | 9/2016 | |
| JP | 2016-526185 A | 9/2016 | |
| WO | WO-2015/138757 A1 | 9/2015 | |
| WO | WO-2017/086739 A1 | 5/2017 | |
| WO | WO-2017/094267 A1 | 6/2017 | |
| WO | WO-2018/030422 A2 | 2/2018 | |

(56) References Cited

FOREIGN PATENT DOCUMENTS

| WO | WO-2024186551 A1 | * | 9/2024 | ............ | G06N 3/042 |
| WO | WO-2024228103 A1 | * | 11/2024 | ............ | G06N 3/045 |

OTHER PUBLICATIONS

Non-Final Office Action in U.S. Appl. No. 16/578,035 on Aug. 21, 2020.
Non-Final Office Action in U.S. Appl. No. 16/578,035 on Sep. 22, 2021.
Non-Final Office Action on U.S. Appl. No. 17/752,786 DTD Jun. 23, 2023.
U.S. Notice of Allowance in U.S. Appl. No. 16/578,035 on Feb. 24, 2022.
U.S. Office Action in U.S. Appl. No. 16/578,035 on Mar. 23, 2021.
U.S. Office Action in U.S. Appl. No. 16/578,035 on Jul. 6, 2021.

* cited by examiner

DEVICE, PROGRAM, METHOD, AND SYSTEM FOR PROVIDING LEARNED MODELS

CROSS-REFERENCE TO RELATED APPLICATIONS

This application is a division of U.S. application Ser. No. 17/752,786, filed May 24, 2022, which is a continuation of U.S. application Ser. No. 16/578,035, filed Sep. 20, 2019, now U.S. Pat. No. 11,375,019, which is a continuation-in-part of International Application No. PCT/JP2017/011216, filed Mar. 21, 2017, the entire contents of each are hereby incorporated by reference.

TECHNICAL FIELD

Embodiments of the present disclosure relates to a technique for introducing and optimizing a learned model at low cost to an industrial apparatus that performs determination, classification, and the like using a learned model by deep learning and the like.

BACKGROUND

Conventionally, in a device such as a machine tool, an abnormality detection device for a finished product, or the like, identification of an operation object, abnormality detection processing, and the like have been performed using a learned model generated by deep learning or the like. In these devices, performing learning specialized in operation environment, operation conditions, and the like of each device achieves improvement in operation accuracy and abnormality detection accuracy.

Examples of devices using such a learned model include Patent Literature 1 and Patent Literature 2. The evolutionary image automatic classification device described in Patent Literature 1 is a device for classifying an image with a learner from various feature amounts, and the metal surface quality evaluation device described in Patent Literature 2 is a device for performing metal surface quality evaluation with a learner based on an image obtained by photographing the surface of metal.

CITATION LIST

Patent Literature

Patent Literature 1: JP 2007-213480 A
Patent Literature 2: JP 2011-191252 A

SUMMARY

Technical Problem

In a case of performing determination and classification using a learner caused to be learned by machine learning or the like including the cases of Patent Literature 1 and Patent Literature 2, it is necessary to set a configuration of the learner specialized in the operation environment, operation conditions, and the like of the device and then to perform learning. It takes considerable cost to perform such setting on the learner and to cause the learner to be learned from zero (e.g., from scratch) until accurate determination and classification can be performed. Then, even if a learned model is obtained with such cost, since it is not possible to use the same learned model in devices different in operation environments, operation conditions, and the like, there has been a problem that it is necessary to perform learning again from scratch.

In order to solve this, a method of preparing a general-purpose learning model that can cope with various operation environments, operation conditions, and the like is conceivable. However, general-purpose learning models have the merit of being applicable to various situations because general-purpose learning models can cope with various operation environments, operation conditions, and the like, but since the learning models are general purpose, there has been a problem that the accuracy is low in any environment and any conditions as compared with the accuracy of the model specialized in the environment and the conditions. In addition, there has been a problem that the complexity of the model increases and the amount of information necessary to achieve the versatility increases, resulting in an increase in operation cost and an increase in memory cost. Furthermore, when each device has a characteristic unique to an individual, there has also been a problem that it is necessary to secure such versatility as to absorb even the individual difference.

Embodiments of the present disclosure have been made in view of the above problems, and it is an object of some embodiments of the present disclosure to provide a server device, a learned model providing program, a learned model providing method, and a learned model providing system, capable of selecting an optimum learned model for various devices different in environments, conditions, and the like to supply the selected learned model.

Solution to Problem

A server device according to some embodiments of the present disclosure is a server device configured to communicate, via a communication network, with at least one device including a learner configured to perform processing by using a learned model, the server device including: a storage unit configured to store a plurality of shared models pre-learned in accordance with environments and conditions of various devices; a device data acquisition unit configured to acquire device data including information on an environment and conditions from the at least one device; a target shared model selection unit configured to select an optimum shared model for the at least one device based on acquired device data; and a transmitter configured to transmit a selected shared model to the at least one device.

In addition, the server device according to some embodiments of the present disclosure further includes: an additional learning processing unit configured to perform additional learning on a shared model by using sample data for performing additional learning on a shared model, and an additional learned model management unit configured to store and manage an additional learned model. When the transmitter performs additional learning on a shared model, the transmitter is configured to transmit an additional learned model to the at least one device.

In addition, in the server device according to some embodiments of the present disclosure, when contents of device data acquired in the device data acquisition unit are contents to which an additional learned model based on another device stored by the additional learned model management unit is applicable, the target shared model selection unit is configured to select the additional learned model in preference to a shared model. The transmitter is configured to transmit a selected additional learned model to the at least one device.

In addition, the server device according to some embodiments of the present disclosure further includes an additional learned model management unit configured to receive an additional learned model transmitted from a device having a function of performing additional learning processing on a shared model to store the additional learned model in a storage unit.

In addition, in the server device according to some embodiments of the present disclosure, the target shared model selection unit is configured to calculate each score obtained by evaluating fitness of each shared model with respect to the at least one device based on device data obtained from the at least one device, and is configured to select a shared model according to the score.

In addition, in the server device according to some embodiments of the present disclosure, the target shared model selection unit is configured to select a shared model by a learned model pre-learned in selecting an optimum shared model by using machine learning based on device data.

A learned model providing program according to some embodiments of the present disclosure is a learned model providing program for causing a server device, communicable with at least one device including a learner configured to perform processing by using a learned model via a communication network, to achieve each function for executing selection processing of a learned model, the learned model providing program for causing the server device to achieve: a storage function of causing a storage means to store a plurality of shared models pre-learned in accordance with environments and conditions of various devices; a device data acquisition function of acquiring device data including information on an environment and conditions from the at least one device; a target shared model selection function of selecting an optimum shared model for the at least one device based on acquired device data; and a transmission function of transmitting a selected shared model to the at least one device.

A learned model providing method according to some embodiments of the present disclosure is a learned model providing method for executing processing of selecting and providing an optimum learned model for a device including a learner configured to perform processing by using a learned model, the learned model providing method including: storage processing of causing a storage means to store a plurality of shared models pre-learned in accordance with environments and conditions of various devices; device data acquisition processing of acquiring device data including information on an environment and conditions from the device; target shared model selection processing of selecting an optimum shared model for the device based on acquired device data; and transmission processing of transmitting a selected shared model to the device.

A learned model providing system according to some embodiments of the present disclosure is a learned model providing system including at least one device including a learner configured to perform processing by using a learned model, and at least one server device communicable with the device via a communication network, the learned model providing system including: in the server device and/or the device, a storage unit caused to store at least one shared model pre-learned in accordance with environments and conditions of various devices; in the server device, a device data acquisition unit configured to acquire device data including information on an environment and conditions from a device requiring a learned model, and a target shared model selection unit configured to search and select an optimum shared model for the device based on acquired device data; and in the server device and/or the device, a transmitter configured to transmit a selected shared model to the device requiring a learned model.

In addition, in the learned model providing system according to some embodiments of the present disclosure, the target shared model selection unit is configured to calculate a corresponding score obtained by evaluating fitness for the device of each shared model based on device data obtained from a device requiring a learned model, and is configured to perform selection of a shared model in accordance with the score.

In addition, in the learned model providing system according to some embodiments of the present disclosure, the device has a function of performing additional learning processing on a shared model. The server device includes an additional learned model management unit configured to receive an additional learned model transmitted from the device to cause a storage unit to store the additional learned model. A target shared model selection unit of the server device is configured to perform selection by including as option, in addition to a shared model, also an additional learned model.

In addition, in the learned model providing system according to some embodiments of the present disclosure, the device has a function of performing additional learning processing on a shared model, and includes a storage unit caused to store an additional learned model, and an additional learned model information transmitter configured to transmit information necessary for selecting an additional learned model to the server device. A target shared model selection unit of the server device is configured to perform selection by including as option, in addition to the shared model, also an additional learned model stored in a storage unit of the device.

Advantageous Effects

According to some embodiments of the present disclosure, in a server device in which a plurality of shared models pre-learned in accordance with environments and conditions of various devices are classified in accordance with the environments and conditions and stored, as compared with the case of using a conventional general-purpose learning model as described above, selecting an optimum shared model and transmitting the optimum shared model to the device leads to an advantage that highly-accurate discrimination/classification according to the situation can be achieved and the operation and memory costs can be lowered because the complexity represented by the learning model is reduced. In addition, there is an advantage that the introduction cost can be significantly reduced as compared with the case where the device independently generates a learned model. In addition, providing an additional learning processing function allows an additional learned model more specialized in the environment and conditions of the device to be obtained, so that it is possible to additionally perform highly accurate inference processing in the device. In this additional learning processing, performing additional learning based on an appropriate shared model according to the environment and conditions of the device allows many effects of an action referred to as transfer learning to be obtained. The transfer learning is expected to perform learning efficiently in an environment in which additional learning is desired to be performed by appropriately using the weights of shared models created in another environment between environments in which environments and conditions of devices are not fully identical.

In addition, causing also the server device to store and manage the additional learned model makes it possible to immediately provide the additional learned model when there is a request from another device of the same environment and conditions. This makes it possible to reduce the operation cost and memory cost for the additional learning as compared with the case of using a general-purpose learning model. Furthermore, configuring a learned model providing system including at least one device and at least one server device makes it possible to select an optimum shared model from the shared models stored in the storage units of a plurality of server devices and/or devices and provide the optimum shared model to a device, so that it is possible to select an optimum shared model out of options of more enormous data.

BRIEF DESCRIPTION OF DRAWINGS

FIG. 1 is a block diagram showing a configuration of a server device 10 according to some embodiments of the present disclosure.

FIG. 2 is a flowchart showing the flow of the learning processing of the additional learning according to some embodiments of the present disclosure.

DETAILED DESCRIPTION

First Embodiment

Hereinafter, an example of a server device according to a first embodiment will be described with reference to the drawings. FIG. 1 is a block diagram showing a configuration of a server device 10 according to some embodiments of the present disclosure. The server device 10 is communicably connected to a plurality of devices 201, 202, . . . , 20n via the communication network 30. The server device 10 and the devices 201 to 20n may be devices designed as dedicated machines, but they are assumed to be those achievable by general computers. In this case, the server device 10 and the devices 201 to 20n may appropriately include a central processing unit (CPU) which would be normally included in a general computer, a graphics processing unit (GPU), a memory, a storage such as a hard disk drive, and a transmitter (not shown). In addition, it goes without saying that various pieces of processing are executed by a program in order to cause these general computers to function as the server device 10 of some embodiments of the present disclosure.

The server device 10 may at least include a device data acquisition unit 11, a target shared model selection unit 12, an additional learning processing unit 13, an additional learned model management unit 14, and a storage unit 15.

The device data acquisition unit 11 may have a function of acquiring device data including information on the environment and conditions of the device generated in any one of the devices 201 to 20n. Here, the device data may include various pieces of data acquirable with the device, such as data necessary for defining attributes such as the device environment, conditions, and units of data, sample data with label information necessary for additionally performing learning, sensor data in an actual device, and network log data. At least, the device data may include data necessary for selecting a shared model. Specifically, various pieces of data may be used as device data, such as position data and an actuator torque amount of a factory robot, acceleration sensor data, image data that includes or does not include the depth acquired by an onboard camera, a laser radar, or the like, displacement sensor data, various types of process data of process automation, sensor data such as various types of data in infrastructure, agriculture, bio/healthcare, and the like, network log data, photo data of products including normal products and abnormal products, speech data, machine type, work type, sensor type, and geographical information.

In addition, regarding the environment and the conditions of the device, for example, as in the case where the device is an operating machine that performs picking, the type of workpiece shape to be an object of picking is divided into several types. For example, the environment, conditions, and the like of the device are individually different. In addition, functions of a learner are different for each device, such as an apparatus for determining a product as an abnormal product and a normal product, or an apparatus for classifying the product into a plurality of items. Therefore, in some embodiments, information such as individual environments and conditions different for each device, may be acquired as device data. The information on the environment, conditions, and the like may be information to be input on the device side according to the format, or performing discrimination from various pieces of data in the server device 10 may define the information such as the environment, conditions, and the like. At that time, a method of specifying the definition of information on environments, conditions, and the like by machine learning using the acquired data may be used.

The target shared model selection unit 12 may have a function of selecting an optimum shared model for the device based on the device data acquired in the device data acquisition unit 11. Here, the shared model is a model pre-learned (or pre-trained) in accordance with the environments and conditions of various devices, and a plurality of shared models are stored in advance in the storage unit 15 described below. Although the degree of learning to be performed in advance may be set to any level, at least, the learning is preferably performed to a degree of having more efficiency than learning from zero (e.g., from scratch) at the device and contributing to cost reduction. The selection in the target shared model selection unit 12 is performed based on the acquired device data, and it is possible to appropriately determine which of the acquired device data is to be used for selecting a shared model. In addition, the method for selecting the shared model may include automatically selecting from the matching degree of each item of the device data. In some embodiments, the shared model may selected by presenting a plurality of shared models with high matching degree to the user to let the user select. The matching degree of items is, for example, determined for each item based on whether each item of device data is matched. In some embodiments, matching degree of items may be determined based on the number of matching of items. In some embodiments, if no shared model matching the definition of the environment, conditions, and the like of the device is found, a new model having a neural network structure suitable for the definition may be generated. The method for selecting a shared model to be a target may include a method in which a shared model is selected based on a preset rule. In some embodiments, a shared model may be selected based on another learned model about the shared model selection, which has been learned using a learning model for selecting an optimum shared model. The another learned model may be different from a shared model and an additional learned model, and may be learned on the selection behavior of the shared model.

In addition, a method of selecting an optimum shared model in the target shared model selection unit 12 may include calculating respective scores evaluated for shared models based on the environment and conditions obtained from the device, and performing selection in accordance with the scores. In addition to the device data on the environment and conditions to be a base of the machine type, the workpiece type, the sensor type, the geographical information, and the like, the score being an evaluation of the fitness of the shared model is evaluated by taking into account more detailed device data such as position data and an actuator torque amount of a factory robot, acceleration sensor data, image data that includes or does not include the depth acquired by an onboard camera, a laser radar, or the like, displacement sensor data, various types of process data of process automation, sensor data such as various types of data in infrastructure, agriculture, bio/healthcare, and the like, network log data, photo data of products including normal products and abnormal products, and speech data. It is set in advance how to evaluate and score these items, and a total score is calculated by summing the scores for each item for each shared model. In the selection of the actual shared model, the shared model with the highest score may be automatically selected, or a plurality of shared models with high scores may be presented to the user and let the user to select. A method may be used which includes calculating a score representing an evaluation of the fitness, causing a learning model for selecting an optimum shared model to be learned, and selecting the shared model based on the learned model. In this case, since the learning model is learned also as to how to score each piece of device data, it is possible to select an optimum shared model.

The additional learning processing unit 13 may have a function of performing additional learning on the shared model selected in the target shared model selection unit 12. Although the shared model is pre-learned, since it is under the situation where the learning in an environment and conditions specialized in the device is not performed, in order to perform determination and classification with high accuracy, it is preferable to perform additional learning and fine adjustment. Thus, the device data acquisition unit 11 may additionally acquire sample data for being used as input data in the additional learning, and use the acquired sample data to perform additional learning of the shared model. In some embodiments, the additional learning is relearning the weight for all layers of the neural network the weight for all layers of the neural network. The present disclosure is not limited to relearning the weight for all layers of the neural network, and some embodiments include freezing a part of the layers and then relearning only the layers other than the part of the layers, or adding more layers. Thus, learning contents under the environment and conditions specialized in the device are added, and it is possible to generate a finely adjusted additional learned model as a more optimum model. In order to function as the additional learning processing unit 13, the server device 10 may have a configuration for functioning as a learner.

The additional learned model management unit 14 may have a function of causing the storage unit 15 described below to store the additional learned model generated in the additional learning processing unit 13 and transmitting the additional learned model to the target device. In addition, in order that the additional learned model can be used by other devices matching the conditions, the additional learned model management unit 14 may have a function of setting and then managing definition information on the environment, conditions, and the like. Thus, when selecting a shared model suitable for a device in the target shared model selection unit 12, the definition information on the environment, conditions, and the like may be determined and provided to the additional learned model such that it is possible to set additional learned models generated based on other devices as option candidates.

The storage unit 15 may have a function of storing a plurality of shared models pre-learned (or pre-trained) in accordance with environments and conditions of various devices. In addition, the storage unit 15 may also store an additional learned model learned by applying sample data for learning the shared model in environments and conditions specialized in the device. In some embodiments, the storage unit 15 does not necessarily have to be in the server device 10, and may be in a system provided on the device side. In that case, the server device 10 may hold information on a storage place where the shared model to be the target is stored, and may transfer the information from the storage place to the device as needed.

Next, the flow of processing until the server device 10 selects a shared model and performs additional learning will be described. FIG. 2 shows a flowchart showing the flow of the learning processing of the additional learning. In FIG. 2, first, device data is collected to select a shared model suitable for the device (S11). Specifically, the device data acquisition unit 11 may receive device data transmitted from a device 20 and collect the device data. An attribute of device data is defined based on the collected device data (S12). The attribute of device data is defined as information on the environment, conditions, and the like of the device to select the shared model. Then, a shared model is searched based on the defined attribute of device data (S13). An additional learned model generated by performing additional learning in another device may also be included as a search target at this time. As a result of the search, it is determined whether the corresponding shared model exists (S14). If the corresponding shared model exists, the shared model is selected and the process proceeds to the next step (S16), and if the corresponding shared model does not exist, a learning model having a configuration of a neural network matching the conditions of the device 20 is newly generated (S15), and the process may proceed to the next step (S16).

A shared model is selected or a learning model is newly generated, and then additional learning is performed by a learner on the shared model or the new learning model (S16). The additional learning is performed by using sample data for performing additional learning, collected from the device 20. After the additional learning is completed, the generated additional learned model is stored in the storage unit 15 (S17). The server device 10 may transmit the generated additional learned model to the device 20.

If the device 20 side has a function of performing additional learning processing, or if the selected shared model matches the conditions of the device 20 in a state of no need for additional learning, the step (S16) and the step (S17) in FIG. 2 may be omitted, and the selected shared model may be transmitted to the device 20 as it is.

Figure 3:
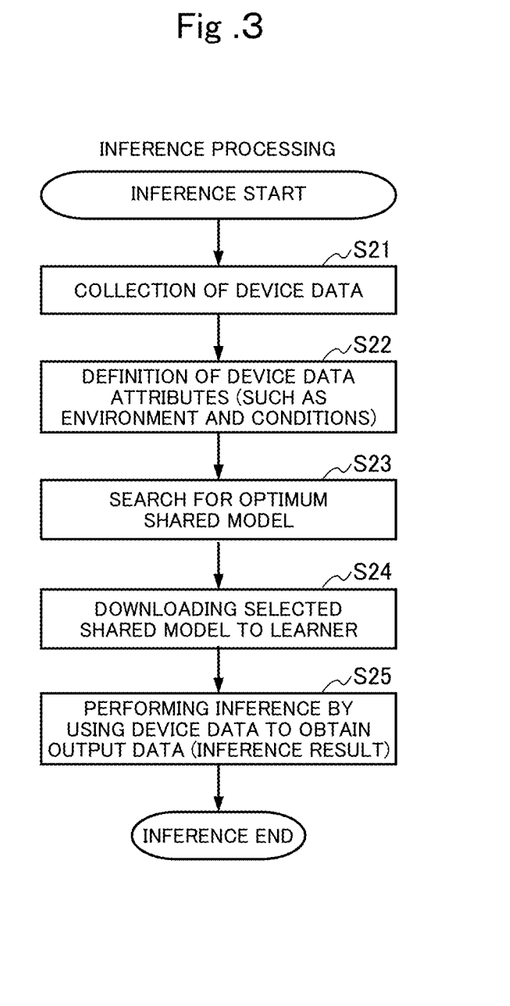
FIG. 3 is a flowchart showing the flow until inference processing is performed in a device according to some embodiments of the present disclosure.

Next, the flow until a shared model is downloaded in the device 20 and inference processing is performed will be described. FIG. 3 shows a flowchart showing the flow until inference processing is performed in the device 20. In FIG. 3, the device 20 that desires to perform inference processing first may collect device data (S21). An attribute of device data is defined based on the collected device data (S22). The definition of the attribute of the device data may be performed on the server device 10 side. Then, in order to search for the optimum shared model by using the device data, the device data is transmitted to the server device 10 (S23). In the server device 10 receiving the device data, selection of an optimum shared model is performed, and additional learning is performed as necessary. Then, in the device 20, the shared model or the additional learned model selected by the server device 10 is downloaded to the learner and stored (S24). Finally, in the device 20 (e.g., the plurality of devices 201, 202, . . . , 20n in FIG. 1), in a state where the shared model or the additional learned model is stored in the learner, inference processing is performed in the learner by using the device data and an inference result as output data is obtained (S25).

The output data is completely different depending on the inference processing to be performed. For example, output data may include determination of the correctness of the planned action, determination of abnormalities of parts, determination of system abnormalities, inspection result of non-defective products or defective products, names of the object appearing in the video (as a result of classification processing), characteristics such as race and gender of the person appearing in the video, and pictures, sounds, sentences, and the like processed according to specific rules.

In some embodiments, if the device 20 side has a function of performing additional learning processing, additional learning may be performed on the shared model after step (S24) in FIG. 3. When the additional learning is performed on the device 20 side, if the additional learned model is configured to be uploaded to the server device 10, the additional learned model on which the additional learning is performed on the device 20 side can also be used in other devices.

A concrete operation example of the present disclosure will be described with the state in FIG. 1 as an example, and for example, the shared model obtained by the device 201 transmitting device data to the server device 10 and being selected is assumed to be "model A", and the additional learned model obtained by performing the additional learning based on the sample data included in the device data of the device 201 is assumed to be "model A'". In addition, the shared model obtained by the device 202 transmitting device data to the server device 10 and being selected is assumed to be "model B", and the additional learned model obtained by performing the additional learning based on the sample data included in the device data of the device 202 is assumed to be "model B'". Thus, since each of the devices 201 and 202 can acquire an optimum and additionally-learned learned model simply by transmitting device data including information on the environment, conditions, and the like of its own device to the server device 10, there is an advantage that the introduction cost can be significantly reduced as compared with the case where the learned models are independently generated in the devices 201 and 202.

In addition, in FIG. 1, when the device 20n transmits device data to the server device 10 and requests a shared model, in a case where the server device 10 determines that the environment, conditions, and the like defined from the device data of the device 20n are the same as those of the device 201 and that the same learned model can be applied, if "model A'" being the additional learned model is transmitted to the device 20n instead of additional learning being performed based on "model A", inference processing can be performed in the device 20n as it is. Thus, if an additional learned model generated based on other devices in the same environment and conditions exists, since it is possible to use (or reuse) the additional learned model directly, the introduction cost can be further reduced, and the time up to introduction can be shortened. In addition, since the size of the optimum neural network can be applied as compared with the case of using a general-purpose learning model, it is possible to reduce the operation cost and memory cost for the additional learning.

In addition, in the situation where products handled in the same factory are changed, it has been conventionally necessary to perform learning from zero (e.g., from scratch) every time the product is changed, but according to the server device 10 of some embodiments of the present disclosure, the optimum shared model can have only to be searched again and downloaded at the timing of the change in the product to be handled. That is, there is an advantage that it is easy to introduce an optimum shared model when the processing content in the same device 20 is changed. Then, if the additional learned model is generated by another device having the same processing content, there is an advantage that an additional learned model capable of performing inference processing with high accuracy can be immediately introduced without requiring time and effort of additional learning processing. Thus, it is also an advantage of the server device 10 of some embodiments of the present disclosure that a large number of devices 201 to 20n access the server device 10 and data on the additional learned model can be accumulated.

In the first embodiment, although the shared model and the additional learned model are separately described, the two differ only in the degree of learning and there is no difference in that the two are learned models. That is, if the shared model and the additional learned model can be selected appropriately according to the degree of learning when viewed from another device, it is not always necessary to distinguish and store them as in the storage unit 15 in FIG. 1. If information for searching for an optimum model at the time of search is attached to the shared model and the additional learned model, the two models can be treated as the same learned model. In this case, the server device 10 of some embodiments of the present disclosure can function even without the additional learned model management unit 14.

In the first embodiment, the server device 10 is provided with the additional learning processing unit 13, but the present disclosure is not limited to this, and an additional learning processing function corresponding to the additional learning processing unit 13 may be provided on each device 20 side. In this case, the additional learned model generated on the device 20 side may be transmitted to the server device 10, but only the information for selecting the additional learned model may be transmitted to the server device 10 without transmitting the entire additional learned model to the server device 10. Only when another device 20 needs the same additional learned model, the additional learned model can be transmitted directly to the server device 10 or the required device 20. Thus, the data area for the server device 10 can be reduced.

In the first embodiment, as shown in FIG. 1, the configuration in which one server device 10 and a plurality of devices 201 to 20n are connected via the communication network 30 is described as an example, but the present disclosure is not limited to this, and for example, by configuring to be communicable via the communication network 30 in a state in which a plurality of server devices 10 mutually recognize a stored shared model (including also the additional learned model), the shared model may be searched from another server device 10 and may be provided to the device. Thus, configuring a learned model providing system including a plurality of server devices and a plurality of devices can provide a shared model stored in any one of the plurality of server devices 10 or the device 20, so that it is possible to select an optimum shared model out of options of more enormous data.

In the first embodiment, target data on additional learning in the additional learning processing unit 13 may be learned by using device data acquired only by the device, but it is not necessary for the present disclosure to stay at this, and data acquired by other devices in the same environment and conditions may be used, or a learned model generated by other devices in the same environment and conditions may be used and updated. In addition, respective additional learned models generated in a plurality of devices in the same environment and conditions may be mixed and a mixed learned model may be generated. Various known techniques can be applied to the mixture of learning models.

Industrial Applicability

Some embodiments of the present disclosure relate to a technique applicable to any field that requires inference processing using a learned model, and can be used as a database of learned models.

REFERENCE SIGNS LIST

10 server device
11 device data acquisition unit
12 target shared model selection unit
13 additional learning processing unit
14 additional learned model management unit
15 storage unit
20, 201 to 20n device
  30 communication network

The invention claimed is:

1. An information processing device comprising:
at least one storage that stores at least a plurality of neural network models, wherein each of the plurality of neural network models is pre-trained; and
at least one processor configured to:
obtain at least one neural network model by searching, based on information regarding at least one of environment or condition, from the plurality of neural network models,
generate another neural network model for a specific environment or condition by performing, using data for additional learning, the additional learning on the at least one neural network model,
wherein the data for the additional learning includes data corresponding to the specific environment or condition,
wherein each of the plurality of neural network models is configured to be used for learning for one or more specific environments or conditions,
wherein each of the plurality of neural network models is associated with information used for the searching, and
wherein the at least one neural network model is selected by a user based on a result of the searching.

2. The information processing device according to claim 1, wherein
the at least one processor is configured to update, as the additional learning, at least a part of parameters of the at least one neural network model to generate the another neural network model.

3. The information processing device according to claim 1, wherein
the at least one processor is configured to perform the additional learning by adding new parameters to the at least one neural network model to generate the another neural network model.

4. The information processing device according to claim 1, wherein
the data for the additional learning is obtained by a device used for the case specific environment or condition.

5. The information processing device according to claim 1, wherein
the plurality of neural network models includes different neural network models used for at least one of abnormality determination, image inspection, image classification, image recognition, or data.

6. The information processing device according to claim 1, wherein
the information processing device is at least one server.

7. The information processing device according to claim 1, wherein
the information processing device is a system that includes at least one server and at least one device.

8. The information processing device according to claim 7, wherein
the additional learning is performed by the at least one device.

9. The information processing device according to claim 1, wherein the at least one processor is configured to present the result of the searching to the user in order for the user to select the at least one neural network model.

10. A system device comprising:
at least one model server; and
at least one device, wherein:
the at least one model server is configured to:
store at least a plurality of neural network models, wherein each of the plurality of neural network models is pre-trained; and
transmit a neural network model to the at least one device, wherein the neural network model is selected by searching, based on information regarding at least one of environment or condition, from the plurality of neural network models,
the at least one device is configured to:
obtain data for additional learning that includes data corresponding to a specific environment or condition,
receive, from the at least one model server, the neural network model, and
generate another neural network model by performing, using the data for the additional learning, the additional learning on the neural network model, and
wherein each of the plurality of neural network models is configured to be used for learning for one or more specific environments or conditions,
wherein each of the plurality of neural network models is associated with information used for the searching, and
wherein the neural network model is selected by a user based on a result of the searching.

11. The system according to claim 10, wherein
the at least one device is configured to transmit the another neural network model to the at least one model server.

12. The system according to claim 10, wherein
the at least one device is configured to transmit information about the another neural network model to the at least one model server without transmitting the another neural network model to the at least one model server.

13. The system according to claim 10, wherein
the at least one device is further configured to perform, by using the another neural network model, at least one of abnormality determination, image inspection, image classification, image recognition, or data generation.

14. The system according to claim 10, wherein
the at least one server is configured to present the result of the searching to the user in order for the user to select the neural network model.

15. The system according to claim 10, wherein
the at least one device is configured to update, as the additional learning, at least a part of parameters of the neural network model to generate the another neural network model.

16. The system according to claim 10, wherein
the at least one device is configured to perform the additional learning by adding new parameters to the neural network model to generate the another neural network model.

17. An information processing device comprising:
at least one storage that stores a plurality of neural network models including at least a plurality of pre-trained models and a plurality of additional learned models, the plurality of pre-trained models including at least a first neural network model, the plurality of additional learned models including at least a second neural network model; and
at least one processor configured to transmit, based on a request, at least one neural network model from the plurality of neural network models stored in the at least one storage to a second device,
wherein the second neural network model is an additional learned model generated by performing additional learning on the first neural network model by using data for the additional learning corresponding to a specific environment or condition,
wherein each of the plurality of pre-trained models is configured to be used for learning for one or more specific environments or conditions,
wherein each of the plurality of additional learned models is generated for a specific environment or condition by performing learning on one of the plurality of pre-trained models, and
wherein the at least one storage stores definition information for the second neural network model, and the definition information includes information regarding the specific environment or condition of the second neural network model.

18. The information processing device according to claim 17, wherein
the at least one processor is configured to generate the second neural network model by performing, using the data for the additional learning, the additional learning on the first neural network model.

19. The information processing device according to claim 17, wherein
the plurality of neural network models includes different neural network models used for at least one of abnormality determination, image inspection, image classification, image recognition, or data generation.

20. The information processing device according to claim 17, wherein
each of the plurality of neural network models is trained for different environments or conditions.

21. The information processing device according to claim 17, wherein
the second neural network model is generated, by a third device performing the additional learning, using the data for the additional learning.

22. The information processing device according to claim 17, wherein
the information processing device is at least one server.

23. The information processing device according to claim 17, wherein
the at least one processor is configured to search, based on the definition information for the second neural network model, the second neural network model from the plurality of neural network models.

24. The information processing device according to claim 23 wherein
the at least one processor is configured to transmit, as the at least one neural network model, the second neural network model searched from the plurality of neural network models to the second device.

25. The information processing device according to claim 23, wherein
the at least one processor is configured to present a result of the searching to a user in order for the user to select the second neural network model.

26. A non-transitory computer readable medium storing program instructions for causing at least one processor to:
obtain data for additional learning that includes data corresponding to a specific environment or condition;
receive a neural network model, from at least one model server storing at least a plurality of neural network models, wherein each of the neural network model is pre-trained, wherein the neural network model is transmitted by the at least one model server and the neural network model is selected by searching, based on information regarding at least one of environment or condition, from the plurality of neural network models; and
generate another neural network model by performing, using the data for the additional learning, the additional learning on the neural network model,
wherein each of the plurality of neural network models is configured to be used for learning for one or more specific environments or conditions, each of the plurality of neural network models is associated with information used for the searching, and the neural network model is selected by a user based on a result of the searching.

* * * * *